A. I. SZUBSKI.
DIRECTION INDICATOR.
APPLICATION FILED SEPT. 25, 1916.

1,245,527.

Patented Nov. 6, 1917.
2 SHEETS—SHEET 1.

Inventor
A. I. Szubski

By A. W. Wilson
Attorney

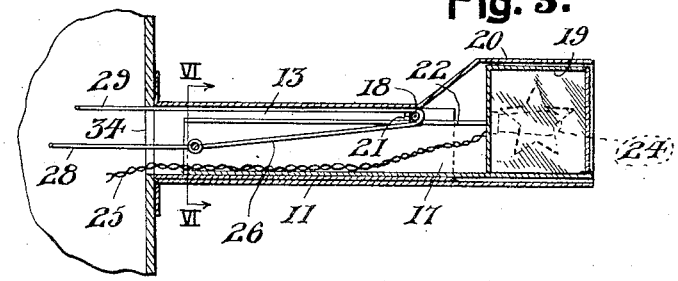
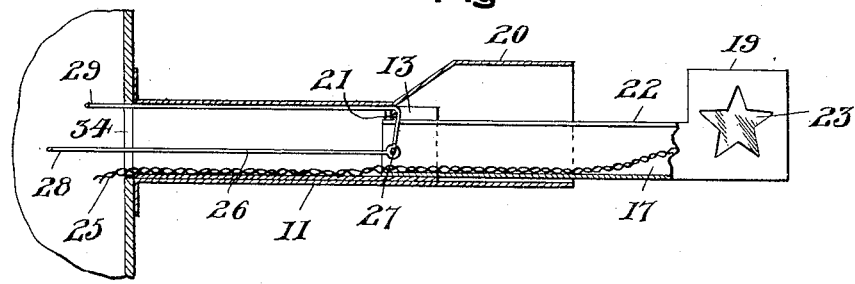
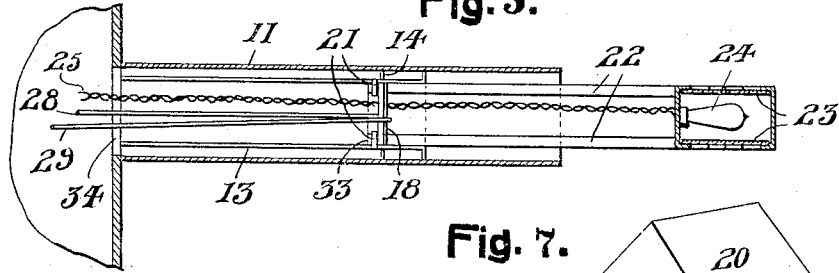
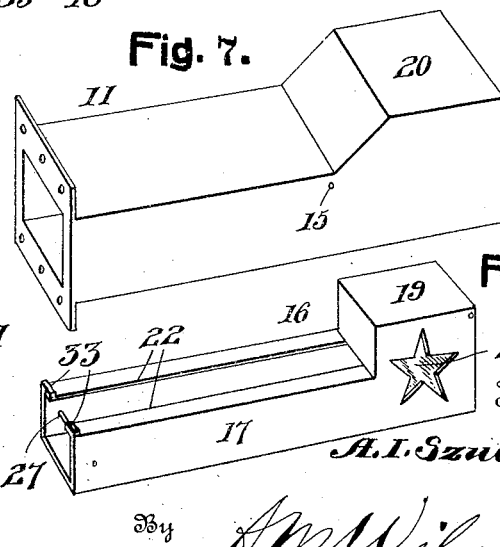
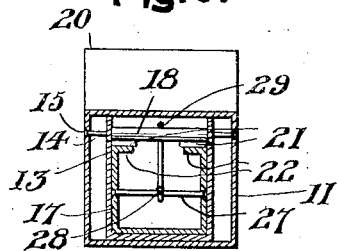
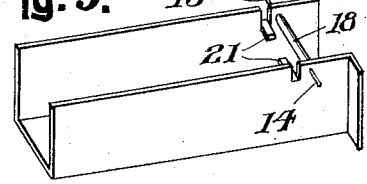

UNITED STATES PATENT OFFICE.

ANDRZEJ I. SZUBSKI, OF CLEVELAND, OHIO.

DIRECTION-INDICATOR.

1,245,527.  Specification of Letters Patent.  Patented Nov. 6, 1917.

Application filed September 25, 1916.  Serial No. 122,156.

*To all whom it may concern:*

Be it known that I, ANDRZEJ I. SZUBSKI, a subject of the Czar of Russia, residing at Cleveland, in the county of Cuyahoga and State of Ohio, have invented certain new and useful Improvements in Direction-Indicators, of which the following is a specification.

This invention relates to certain new and useful improvements in direction indicators.

The primary object of the invention is the provision of indicator members oppositely positioned forwardly of a vehicle readily operable from the driver's seat thereof whereby the intended course of travel is readily denoted to the traveling public.

A further object of the device is to provide a direction indicator adapted to be projected when found desirable to indicate the future course of travel, the same having illuminating means, rendering the indicator plainly viewable at night.

A still further object is to provide a mounting means upon a vehicle for an illuminated slidable direction indicator member whereby the latter may be manually reciprocated as found desirable by the operator of the vehicle.

In the drawings forming a part of this application and in which like designating characters refer to corresponding parts throughout the several views:—

Fig. 3 is an enlarged vertical longitudinal central sectional view of one of the devices and the adjacent portion of the vehicle, with the indicator in its normal retracted position.

Fig. 4 is a view similar to Fig. 3 with the indicator projected and partially shown in side elevation.

Fig 5 is a horizontal sectional view of Fig. 4.

Fig. 6 is a transverse sectional view taken upon line VI—VI of Fig. 3.

Fig. 7 is a perspective view of the indicator casing.

Fig. 8 is a perspective view of the shiftable indicator, and,

Fig. 9 is a perspective view of the indicator guide detached from the casing.

Figure 1:
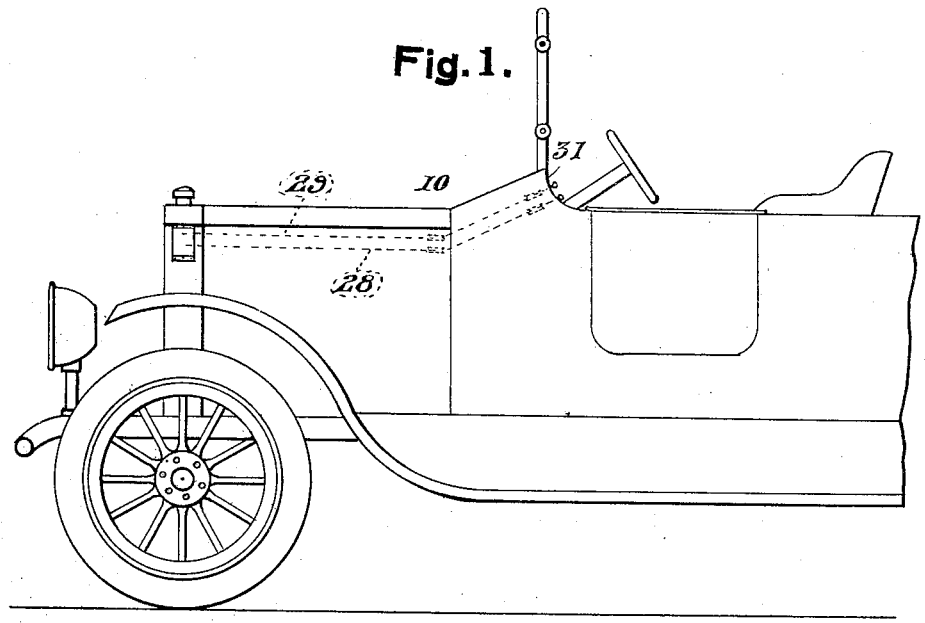
Figure 1 is a side elevation of the forward portion of an automobile provided with the present device.
Figure 2:
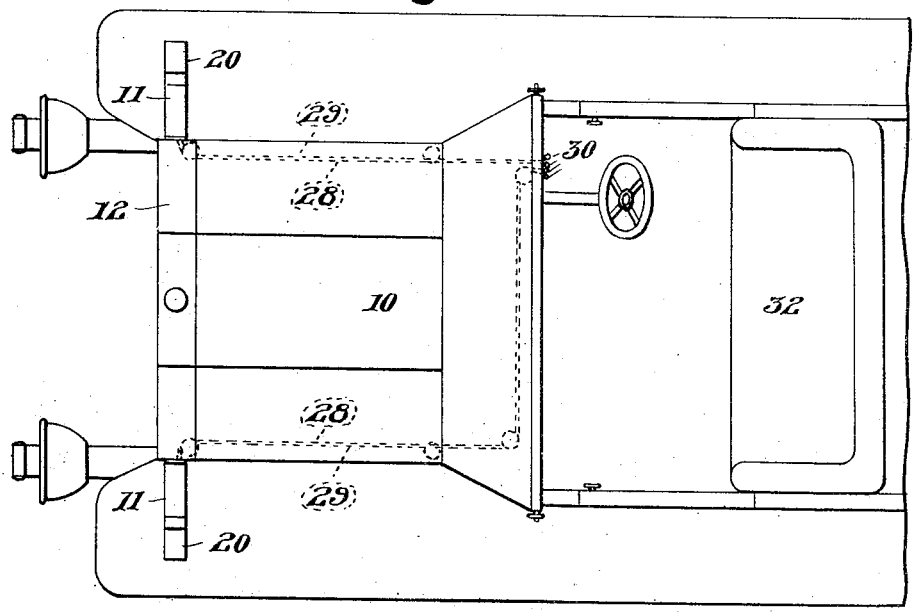
Fig. 2 is a top plan view thereof.

It being understood that the present direction indicator may be employed with any form of vehicle, the same is herein illustrated operatively installed upon an automobile 10 with the elongated casings 11 of the device outwardly projecting in horizontal alinement with each other at opposite sides of the radiator 12 of the vehicle. The interior of the casing 11 communicates with the interior of the radiator by means of openings 34 arranged through the radiator.

Each of the casings 11 is provided with a guide member 13 of channel-bar formation secured within the casing 11 by means of a rod 14 projecting transversely through the guide 13 and the said casing, the opposite ends of the rod projecting through perforations 15 in the opposite walls of the latter. The indicator 16 is provided with a channel-shaped body 17 slidably arranged within the guide 13 beneath an anti-friction roller 18 journaled upon the said rod 14, while a substantially cubical end or head 19 of the indicator 16 is arranged at the outer end of the body-portion 17, being adapted for reception within the enlarged outer end 20 of the casing 11 when the indicator is retracted. Inturned ears 21 are provided upon the opposite sides of the guide 13 overlying the inturned top flanges 22 of the indicator body 17, which ears together with the roller 18 prevent any vertical shifting of the indicator within the guide. Transparent windows 23 are provided on the opposite faces of the head 19 being of any desirable form, such as star-shape herein illustrated, the same being preferably formed of colored glass or similar material illuminated when desired by the incandescent lamp 24 arranged within the said head and having circuit wires 25 communicating therewith. An operating cord 26 is provided for the indicator 16 having an intermediate portion thereof secured to a transverse bar 27 carried by the indicator body 17, the opposite ends of the cord 26 passing through the casing 11 into the radiator 12 with the opposite end portions 28 and 29 terminating in pull buttons 30 preferably arranged upon the dash-board 31 of the vehicle easily accessible from the driver's seat 32 thereof. The cord portion 29 passes over the aforementioned roller 18 whereby a pull exerted upon the said portion 29 projects the indicator 16 outwardly from the position indicated in Fig. 3 to that shown in Figs. 4 and 5 of the drawings. When the indicator is projected, the cord 26 may then be pulled for returning the indicator to its retracted position within the casing 11 with the head 19 seated within the flared portion 20 of the casing, the latter having an open upper end adapted to receive the same. Any desirable form of stops 33 are provided adjacent the rear ends of the indicator flanges 22 limiting the forward movement of the indicator 16.

From this detailed description of the invention and the operation thereof, it will be apparent that the driver of the automobile 10 when intending to travel toward the right may pull the button 30 of the cord portion 29 of the indicator at the right-hand side of the radiator 12 whereby the member 16 will be projected indicating such intended course of travel. Thereafter, the operator may exert a pull upon the cord portion 28, returning the member 16 inwardly to its normal retracted position.

What I claim as new is:—

A direction indicator for automobiles, including a casing adapted to extend laterally from an automobile at the forward end thereof, a trough-like guide positioned within said casing and having vertical lateral flanges at its forward end in contact with the inner sides of the casing, said trough like guide having a transverse rod extending therethrough and secured at its ends in the casing, said rod having positioned thereon a tubular roll within said guide, and a slidable indicator body within said trough-like guide having inturned ears coöperating with said inturned flanges of said indicator body to guard against the vertical displacement of the indicator.

In testimony whereof I affix my signature.

ANDRZEJ I. SZUBSKI.

Copies of this patent may be obtained for five cents each, by addressing the "Commissioner of Patents, Washington, D. C."